United States Patent
Waters

(10) Patent No.: US 12,119,459 B2
(45) Date of Patent: Oct. 15, 2024

(54) BATTERY MODULES AND SYSTEMS FOR REMOTE COMMAND AND CONTROL OF SAME

(71) Applicant: John E. Waters, Fishers, IN (US)

(72) Inventor: John E. Waters, Fishers, IN (US)

(73) Assignee: John E. Waters, Fishers, IN (US)

( * ) Notice: Subject to any disclaimer, the term of this patent is extended or adjusted under 35 U.S.C. 154(b) by 0 days.

(21) Appl. No.: 17/394,943

(22) Filed: Aug. 5, 2021

(65) Prior Publication Data

US 2022/0102762 A1 Mar. 31, 2022

Related U.S. Application Data

(63) Continuation of application No. 16/220,142, filed on Dec. 14, 2018, now Pat. No. 11,101,504, which is a (Continued)

(51) Int. Cl.
*H01M 10/42* (2006.01)
*G08B 5/36* (2006.01)
(Continued)

(52) U.S. Cl.
CPC ............ *H01M 10/425* (2013.01); *G08B 5/36* (2013.01); *H01M 6/5044* (2013.01); *H01M 10/4207* (2013.01); *H01M 10/482* (2013.01); *H01M 10/488* (2013.01); *H01M 10/6551* (2015.04); *H01M 10/6555* (2015.04); *H01M 50/211* (2021.01); *H01M 50/222* (2021.01); *H01M 50/227* (2021.01); *H01M 50/229* (2021.01); *H01M 50/24* (2021.01); *H01M 50/296* (2021.01); *H01M 50/574* (2021.01); *H01M 50/588* (2021.01); *H01M 50/591* (2021.01); *H01M 2010/4278* (2013.01); *H01M 50/242* (2021.01); *H01M 50/262* (2021.01); *H01M 50/271* (2021.01); *H01M 50/289* (2021.01); *H01M 50/502* (2021.01);
(Continued)

(58) Field of Classification Search
CPC ............ H01M 10/425; H01M 2/1016; H01M 10/6555; H01M 2/1094; H01M 10/4207; H01M 10/482; H01M 10/488; H01M 2010/4278; H01M 50/296
See application file for complete search history.

(56) References Cited

U.S. PATENT DOCUMENTS

| | | |
|---|---|---|
| 4,289,836 A | 9/1981 | Lemelson |
| 6,356,050 B1 | 3/2002 | Hussaini |
| (Continued) | | |

FOREIGN PATENT DOCUMENTS

| | | |
|---|---|---|
| CN | 203644851 U | 6/2014 |
| CN | 105637377 A | 6/2016 |
| (Continued) | | |

OTHER PUBLICATIONS

International Application No. PCT/US2017/037495 International Search Report and Written Opinion, mailed Sep. 13, 2017.

*Primary Examiner* — Stewart A Fraser
(74) *Attorney, Agent, or Firm* — Woodard, Emhardt, Henry, Reeves & Wagner, LLP

(57) ABSTRACT

Described are remote command-enabled battery modules and systems and methods incorporating them.

11 Claims, 12 Drawing Sheets

Related U.S. Application Data continuation of application No. PCT/US2017/037495, filed on Jun. 14, 2017.

(60) Provisional application No. 62/349,761, filed on Jun. 14, 2016.

(51) Int. Cl.
| | |
|---|---|
| *H01M 6/50* | (2006.01) |
| *H01M 10/48* | (2006.01) |
| *H01M 10/6551* | (2014.01) |
| *H01M 10/6555* | (2014.01) |
| *H01M 50/211* | (2021.01) |
| *H01M 50/222* | (2021.01) |
| *H01M 50/227* | (2021.01) |
| *H01M 50/229* | (2021.01) |
| *H01M 50/24* | (2021.01) |
| *H01M 50/296* | (2021.01) |
| *H01M 50/574* | (2021.01) |
| *H01M 50/588* | (2021.01) |
| *H01M 50/591* | (2021.01) |
| *H01M 50/242* | (2021.01) |
| *H01M 50/262* | (2021.01) |
| *H01M 50/271* | (2021.01) |
| *H01M 50/289* | (2021.01) |
| *H01M 50/502* | (2021.01) |
| *H01M 50/509* | (2021.01) |
| *H01M 50/51* | (2021.01) |
| *H01M 50/512* | (2021.01) |

(52) U.S. Cl.
CPC .......... *H01M 50/509* (2021.01); *H01M 50/51* (2021.01); *H01M 50/512* (2021.01)

(56) References Cited

U.S. PATENT DOCUMENTS

| | | | |
|---|---|---|---|
| 6,773,839 B2 | 8/2004 | Fuglevand et al. | |
| 7,388,350 B1 | 6/2008 | Wright | |
| 8,310,201 B1 | 11/2012 | Wright | |
| 9,774,210 B1 | 9/2017 | Wright | |
| 2013/0164567 A1* | 6/2013 | Olsson | H01M 10/425 |
| | | | 429/93 |
| 2014/0045024 A1 | 2/2014 | Waters | |
| 2014/0312848 A1* | 10/2014 | Alexander | H02J 7/007192 |
| | | | 320/134 |
| 2015/0333377 A1* | 11/2015 | Davila | G06F 1/26 |
| | | | 429/61 |
| 2016/0093456 A1 | 3/2016 | Dulle et al. | |
| 2016/0336623 A1* | 11/2016 | Nayar | H02J 7/0068 |
| 2018/0026255 A1 | 1/2018 | Helenthal et al. | |

FOREIGN PATENT DOCUMENTS

| | | |
|---|---|---|
| DE | 10 2015 002077 B3 | 6/2016 |
| EP | 2 105 982 A1 | 9/2009 |
| EP | 2 105 982 B1 | 9/2009 |
| KR | 20140091362 A | 7/2014 |
| RU | 2594354 C2 | 8/2016 |
| WO | 1999/052170 A1 | 10/1999 |
| WO | 2013/002337 A1 | 1/2013 |
| WO | WO 2015/058165 A1 | 4/2015 |

\* cited by examiner

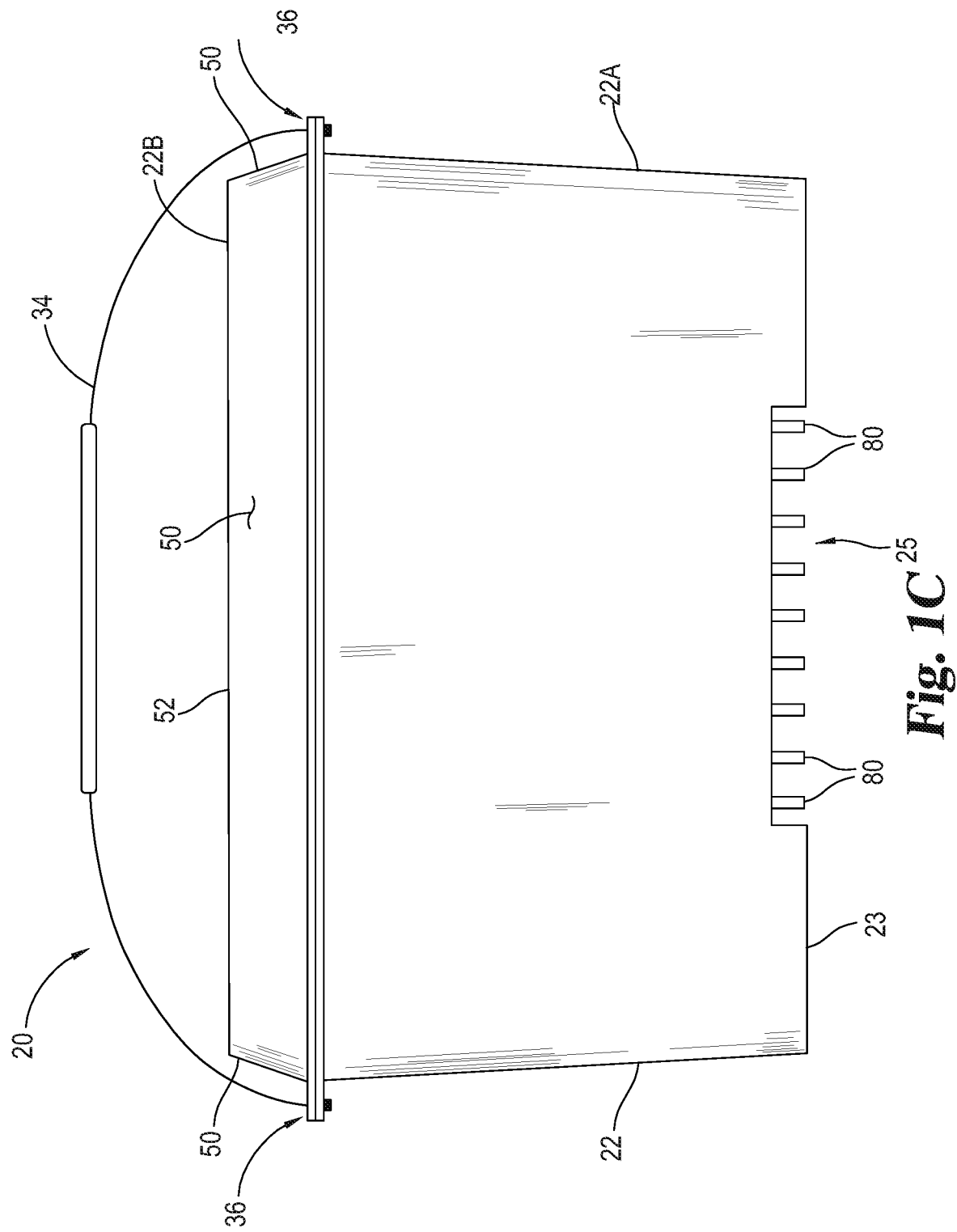

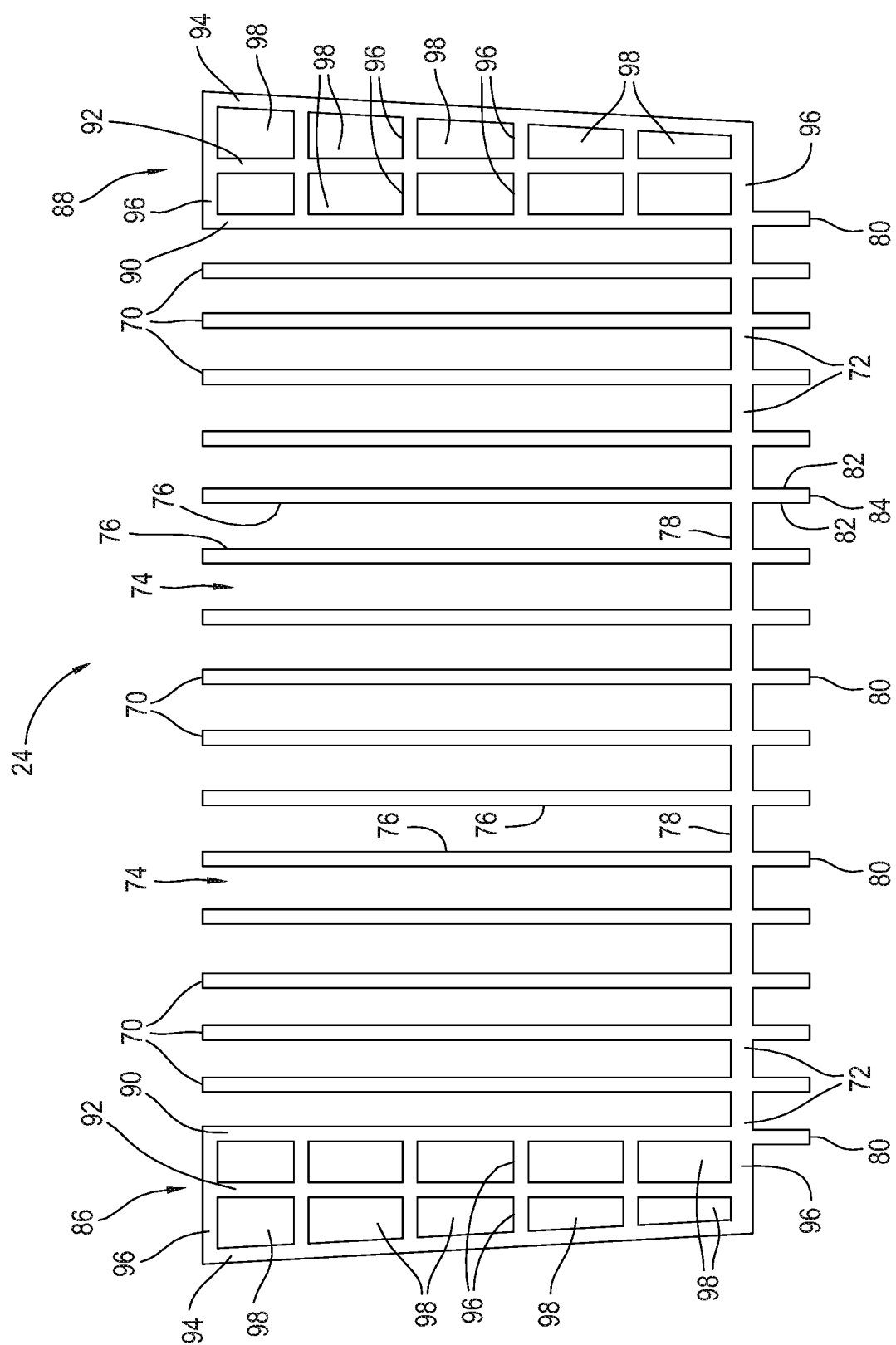

BATTERY MODULES AND SYSTEMS FOR REMOTE COMMAND AND CONTROL OF SAME

This application is a continuation of Ser. No. 16/220,142, filed Dec. 14, 2018, which is a continuation of PCT/2017/037495, filed Jun. 14, 2017 which claims the benefit of priority of U.S. Provisional Patent Application No. 62/349,761, filed Jun. 14, 2016, which are all hereby incorporated herein by reference in their entirety.

BACKGROUND

The present invention relates generally to batteries and uses thereof, and in certain embodiments to battery modules including unique features that are useful in achieving remote monitoring, command and control of the battery modules, for example by multiple remote users at dispersed locations.

Technologies in the fields of battery materials and chemistries have advanced significantly in the past few decades. The use of batteries, off-grid, to power a multitude of transportation and utility apparatuses is growing. Many of these uses, however, put high physical and performance demands upon the batteries. This can be particularly true in regions where grid power has traditionally been unavailable.

Batteries in general, and more particularly lithium-ion batteries, present challenges. For instance, variations in electrical storage with operating temperatures are often experienced which can decrease battery life and performance. Lithium-ion and other batteries can lose capacity at an accelerated rate when stored or operated in higher temperature environments. Complicating the matter is the fact that some lithium-ion batteries tend to increase temperature during operation due to Joule heating within the batteries. As the temperature of some lithium-ion batteries increases to a destructive level, cells within the batteries can become unstable and begin internally discharging across their negative and positive terminals. This discharge can generate Joule heating and warm the battery further. In turn, the increasing temperature causes further instability, discharge, and (potentially) the loss of the battery.

Another challenge with many modern battery designs stems from the fact that battery cell constructions are physically vulnerable. Illustratively, lithium ion battery chemistry is often encompassed in a "soft pouch" or "pouch cell" format, where the internal components and chemistries are incorporated within a flexible polymeric pouch. If this pouch is damaged, leaks can result which can potentially create electrical "short" circuits that can lead to battery loss. Similar issues can be experienced with other mechanically vulnerable battery cell constructions.

Implementation and widespread adoption of battery power in communities has been slow in developing, which is possibly due at least in part to issues related to capital expense, technology complications and user impressions in respect of system reliability and flexibility in application.

In light of the background in this area, needs exist for improved and/or alternative battery modules enabled for remote monitoring, command and control, as well as systems implementing use of such battery modules. In some of its aspects, the present disclosure is addressed to these needs.

SUMMARY

In one aspect, provided is a battery module for remote command. The battery module includes a battery case and a plurality of battery cells received within the battery case and electrically connected to one another. The battery module also includes a negative electrical terminal electrically coupled to the battery cells and a positive electrical terminal electrically coupled to the battery cells. The battery cells provide a voltage potential between the positive electrical terminal and the negative electrical terminal. The battery module also includes electronics received within the battery case and configured to enable electromagnetic signaling to and from the battery module, and a disable mechanism responsive to the electromagnetic signaling to the battery module and operable to disable use of the voltage potential. In some forms, the disable mechanism interrupts electrical continuity between the positive electrical terminal and the negative electrical terminal. In other forms, the disable mechanism is operable to shield at least one of the positive electrical terminal and the negative electrical terminal from external electrical contact.

In another aspect, provided is a battery module for remote command. The battery module includes a battery case and a plurality of battery cells received within the battery case and electrically connected to one another. The battery module also includes a negative electrical terminal electrically coupled to the battery cells and a positive electrical terminal electrically coupled to the battery cells. The battery cells provide a voltage potential between the positive electrical terminal and the negative electrical terminal. The battery module also includes electronics received within the battery case and configured to enable electromagnetic signaling to and from the battery module. The electronics are also operable to generate a value representative of cumulative power drawn from the battery cells over a period of time and to transmit the value to a remote location by the electromagnetic signaling from the battery module. The battery module can also include a disable mechanism responsive to the electromagnetic signaling to the battery module and operable to disable use of a voltage potential between the positive electrical terminal and the negative electrical terminal. The battery module can also include a plurality of visible indicators, for example lights, mounted to the battery case for signaling a condition of the battery module to a user.

In another aspect, provided is a system for management and control of one or more battery modules. The system includes one or more battery modules including a battery case, a plurality of battery cells received within the battery case and electrically connected to one another. The battery module(s) also include a positive electrical terminal electrically coupled to the battery cells and a negative electrical terminal electrically coupled to the battery cells. The battery cells provide a voltage potential between the positive electrical terminal and negative electrical terminal. The battery module also includes electronics received within the battery case and configured to enable electromagnetic signaling to and from the battery module. The system further includes a controller remote from and communicatively coupled to the one or more battery modules, with the controller being configured to receive the electromagnetic signaling from the battery module and transmit the electromagnetic signaling to the battery module.

In aspects herein including or employing a battery module(s), the battery module(s) can include a polymeric case defining a plurality of openings in a wall thereof. A shock dampening material is received within the polymeric case, and a monolithic, thermally-conductive, reinforcing divider is at least partially received within the polymeric case. The monolithic, thermally-conductive, reinforcing divider is arranged to structurally reinforce the polymeric case, with the shock dampening material positioned between the reinforcing divider and the polymeric case and operable to dampen and transfer forces between the polymeric case and the reinforcing divider. The monolithic, thermally-conductive, reinforcing divider includes a plurality of dividing wall members defining a plurality of cavities therebetween, with the cavities located within the polymeric case. The monolithic, thermally-conductive reinforcing divider also defines a plurality of thermal transfer projections received through respective ones of the openings of the polymeric case and providing thermal transfer members projecting externally of the polymeric case. Lithium ion battery pouch cells are received within the polymeric case and include lithium ion battery pouch cells received at least partially in respective ones of the divider cavities. An electronic control board is received within the polymeric case and electrically couples the lithium ion battery pouch cells in series to provide a battery pouch cell series or module. Negative and positive electrical terminals are electrically coupled to the battery pouch cell series on respective ends thereof. In preferred forms, the reinforcing divider is composed of extruded aluminum, which can potentially be modified post-extrusion, e.g. by machining, to incorporate additional features. The reinforcing divider can also define at least one external reinforcing scaffolding structure that includes a plurality of elongate scaffold walls extending in a first direction and a plurality of cross-scaffold walls extending in a second direction transverse to said first direction and connecting the elongate scaffold walls. The battery case can include at least first and second case portions which are sealed together to form an enclosure, for example at mating peripheral rims or lips provided on each portion.

In other aspects herein, the battery module(s) of or employed in systems herein can include a battery case and a monolithic divider element at least partially received within the battery case. The monolithic divider element includes a plurality of dividing wall members defining a plurality of cavities therebetween. A plurality of battery cells are received within the case and include battery cells received at least partially in respective ones of the divider cavities and electrically connected to provide a battery cell series. A negative electrical terminal is electrically coupled to a first end of the battery cell series, and a positive electrical terminal is electrically coupled to a second end of the battery cell series. In certain embodiments, the divider element is composed of extruded aluminum, and or defines at least one external reinforcing scaffolding structure including a plurality of elongate scaffold walls extending in a first direction and a plurality of cross-scaffold walls extending in a second direction transverse to the first direction and connecting the elongate scaffold walls. In addition or alternatively, the battery module can include a shock dampening material positioned between the divider element and the battery case. The monolithic divider element can be only partially received in the battery case, and can define one or more thermal transfer elements, desirably a plurality of thermal transfer elements, exposed externally of the battery case. The transfer elements can be in heat transfer relationship with the dividing walls, and the dividing walls can be in heat transfer relationship with the battery cells.

In still other aspects herein, the battery module(s) employed can include a battery case and a divider element at least partially received within the battery case. The divider element includes a plurality of dividing wall members defining a plurality of cavities therebetween. A plurality of battery cells is received within the polymeric case and includes battery cells received at least partially in respective ones of said cavities and electrically connected in a battery cell series. A negative electrical terminal is electrically coupled to a first end of the battery cell series. A positive electrical terminal electrically coupled to a second end of the battery cell series.

Beneficial variants of the embodiments disclosed above in this Summary include those containing unique structural and/or functional features as described for the embodiments in the Detailed Description below.

Additional embodiments, as well as features advantages of aspects of the invention, will be apparent to persons of ordinary skill in the relevant art from the descriptions herein.

BRIEF DESCRIPTION OF THE FIGURES

FIG. 1C provides a perspective view of one embodiment of a battery module illustrating features that may be included in remote control-enabled battery modules herein and systems associated with them.

FIG. 5 provides a front view of the reinforcing divider of the battery module of FIGS. 1C to 4.

DETAILED DESCRIPTION

For the purposes of promoting an understanding of the principles of the invention, reference will now be made to certain embodiments thereof and specific language will be used to describe the same. It will nevertheless be understood that no limitation of the scope of the invention is thereby intended, and alterations and modifications in the referenced embodiments, and further applications of the principles of the invention as illustrated herein are contemplated as would normally occur to one skilled in the art to which the invention relates. In the discussions below, a number of features of a battery module(s) and/or a system for command and control of a battery module(s) are disclosed. It will be understood that any one, some or all of such disclosed features can be combined with the general embodiments discussed in the Summary above or set forth in the Claims below to arrive at additional disclosed embodiments herein. Features disclosed herein are to be understood to be combinable with each other unless it is clearly stated or it is clear from context that they are not combinable.

Figure 1A:
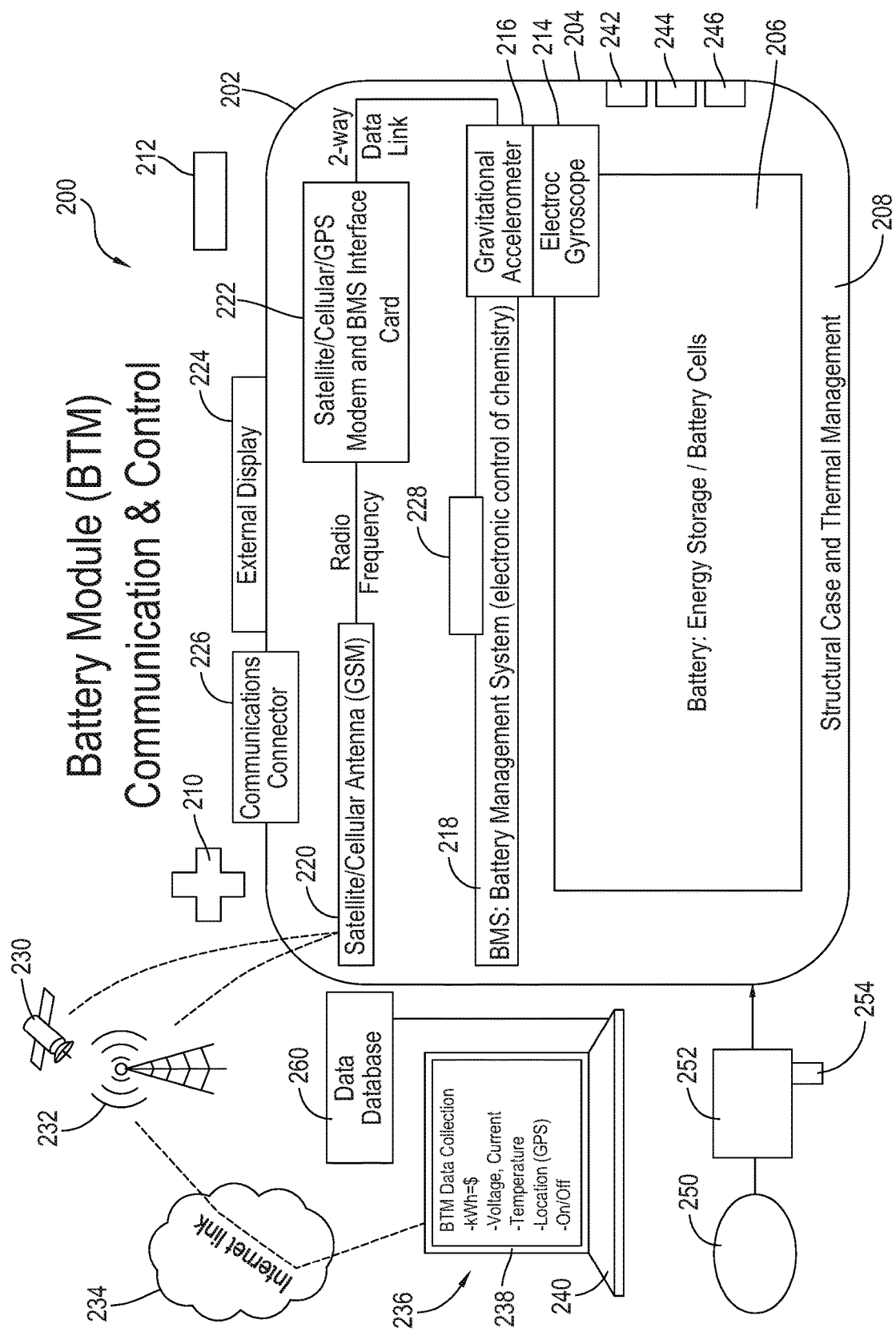
FIG. 1A provides a schematic diagram of a battery module enabled for remote monitoring, command and control and a communication and control system associated with the battery module.

As disclosed above, in certain aspects, the present disclosure relates to battery modules that are enabled for remote monitoring, command and control, and to systems that incorporate such battery modules. With reference now to FIG. 1A, shown is one embodiment of a battery module that is enabled for remote monitoring, command and control, and a communication and control system 200 associated with the battery module. System 200 includes a battery module 202. Battery module 202 can optionally have the features described for battery modules in conjunction with FIGS. 1C to 9 herein. Thus, battery module 202 can have a battery case 204 enclosing a plurality of battery cells 206. Battery module 202 can also have thermal management features 208, for example thermally conductive elements with portions thereof extending outside case 204 as disclosed herein. Other thermal management features, for example those that involve circulating liquid or other fluid coolants within the battery case 204, for example to remove heat generated by the battery cells, can also be used. Battery module 202 includes a positive terminal 210 and a negative terminal 212. Battery module 202 also includes electronics that participate in and enable the communication and monitoring, command and control features described herein. Thus, battery module 202 can include an electronic gyroscope 214 or a plurality of such gyroscopes, which can detect and give indication of the orientation of the battery module 202, e.g. with respect to gravity. Battery module 202 can also include a gravitational accelerometer 216, or a plurality of such accelerometers, which can detect and provide indication of accelerations experienced by the battery module 202. Battery module 202 can also include a control board 218 which, as discussed elsewhere herein, may be electrically connected to the battery cells 206 of battery module 202 and can function in both detecting conditions of and controlling usage of such battery cells 206. Battery module 202 also includes a satellite and/or cellular antenna 220 enabling communication by satellite, cellular, or other electromagnetic signal-based communication systems, or a plurality of such antennas. The antenna or antennas are preferably housed within battery case 204. In conjunction therewith, battery module 202 can include a satellite and/or cellular and/or GPS modem and VMS interface card 222. This interface card 222 can be communicatively coupled to the other electronics of the battery module 202, for example the control board 218, the accelerometer 216, and the gyroscope 214. In this manner, a two way datalink may be enabled by which these electronics can communicate with and be controlled remotely by electromagnetic signal-based communication systems. Battery module 202 can also include an externally visible display 224, for example as described elsewhere herein. Battery module 202 can also include a communications connector 226 by which wired communications can be made with battery module 202 and in particular its electronic detection, control and signaling elements. Battery module 202 also includes an on/off switch 228 by which the remote signaling to the battery module 202 can be used to disable the battery module 202 from use to draw power from battery module 202. The switch 228 can be a dedicated circuit component such as a relay or the like, or can be a software based switch for example which can be controlled by circuit board 218. Additionally, other means of disabling use of battery module 202 can be used. For example, the battery module 202 can include components which can be activated to prevent access to the positive terminal 210 and/or the negative terminal 212 to prevent a user drawing power from the battery. For example, the terminal or terminals could retract into the battery case, e.g. as driven by a motor mounted in or on the battery case 204, to prevent access to one or both of them, and/or the battery module 202 can include a covering component, e.g. driven by a motor, which can be activated to cover one or both of the positive terminal 210 or negative terminal 212, to prevent a user drawing power from battery module 202. These and other ways to prevent use of the battery module 202 are contemplated. System 200 also includes electromagnetic signal-based communication links (e.g. cellular or satellites) through satellites 230 and/or cell towers 232, for example routed through the internet 234, to a remote data acquisition and command center 236. Center 236 can include one or more computers or other controllers 238 (e.g. computers or other microprocessors), along with one or more user inputs 240 (e.g. keyboards) into the controller(s) 238.

In some embodiments, in addition to or as an alternative to external display 224, battery module 202 can include one or more indicators, for example lights, to signal a user of the battery module. The indicator(s) can be remotely activated and/or deactivated by the remote data acquisition and command center 236. For example, the battery module can include lights 242, 244 and 246 that are visible to a user from locations external of the battery module 202. Lights 242, 244 and 246 can be of different color from one another (for example green, yellow and red), and/or can be enabled for operation in constant on, flashing, or off conditions. These lights can be powered by battery cell(s) of the battery module 202. These lights can be remotely controlled from command center 236 to signal a user of module 202 with respect to a condition of the battery module 202 (e.g. as in a warning) and/or with respect to an action that will be taken with respect to battery module 202 at a future time, as remotely controlled by command center 236 (which may sometimes be referred to as headquarters or "HQ"). Illustratively, lights 242, 244 and 246 can be green, yellow and red, respectively. The following series of indicator conditions can then be adopted:

| | |
|---|---|
| Green light 242 constant on, lights 244 and 246 off | Battery operation condition acceptable; no warnings to provide to user |
| Green light 242 flashing lights 244 and 246 off | Battery operation condition acceptable; yellow-level warning condition will ensue at a future time unless some action is taken (e.g. by user) |
| Yellow light 244 constant on, lights 242 and 246 off | Yellow-level (intermediate level) warning condition (e.g. indicative of a condition of the battery module and/or of an account associated with the battery module) |
| Yellow light 244 flashing, lights 242 and 246 off | Yellow-level (intermediate level) warning condition; red-level (high level) warning condition will ensue unless some action is taken (e.g. by user) |

| | |
|---|---|
| Red light 246 constant on, lights 242 and 244 off | Red level (high level) warning condition (e.g. indicative of a condition of the battery module and/or of an account associated with the battery module) |
| Red light 246 flashing, lights 242 and 244 off | Highest level warning condition (e.g. indicative of an imminent shut down or disabling of the battery module) |

These and other strategies for using one or more lights mounted on and/or in battery module 202 to signal the user can be used in systems herein, for example to signal the user with respect to notifications or warnings as to the battery module and/or an associated user account as discussed elsewhere herein.

The system 200 can also include an electrical charging source 250 (e.g. a solar-powered, wind-powered, or electrical grid-powered source) coupled or capable of coupling to the battery module 202 to electrically charge the battery module 202. The charging source 250 can be coupled or capable of coupling to the battery module 202 through an inverter or other suitable electrical component 252. Component 252 can also be enabled for remote control by command center 236 via electromagnetic signaling, for example including its own satellite and/or cellular antenna 254. In one mode, component 252 can include a switch, relay or other component (e.g. a dedicated component or software-implemented) by which remote signaling from center 236 can enable and/or disable charging of battery module 202 by charging source 250. This can, for example, be implemented by command center 236 in response to a condition of the battery module 202 and/or in response to a condition of a user account associated with battery module 202. Electrical connection of the battery module 202 to the charging source 250 can be through charging leads selectively connectable to positive and negative electrical terminals 210 and 212 and/or through a different, dedicated charging port provided on battery module 202.

As discussed above, battery module(s) 202 are enabled for self-sensing or detection of battery module conditions and for electromagnetic signaling to report these conditions remotely to command center 236. In this regard, the detection and signaling from the battery module can in some forms be representative of one of, any combination of some of, or all of:

a. a voltage value, for example of the battery module, of a battery cell of the battery module, and/or of a battery cell series of the battery module;
b. a temperature value, for example of the battery module, a region of the battery module, and/or a battery cell of the battery module;
c. a capacity value representing an amount of energy that can be extracted from the battery module under a specified set of conditions (typically given in Amphours);
d. one or more orientation values representing one or more orientations of the battery module, for example relative to gravity (e.g. x, y, z, pitch, yaw, and/or roll values);
e. a thermal value;
f. a battery module abuse condition, for example signaling a breach of the battery case and/or a tampering with the electronics and/or an acceleration of the battery module, e.g. above a specified threshold;
g. an electrical current value, for example representing a current draw on the battery module, a battery cell series of the battery module, and/or a battery cell of the battery module;

h. an energy usage value, for example representing a cumulative amount of energy extracted from the battery module over a specified period of time (e.g. expressed in kilowatt hours (kWh));
i. a battery module theft condition, for example detected by physical breach of or damage to a security structure, such as a lock, upon or associated with the battery module, and/or detected by a usage pattern of the battery module that differs from an historical or expected usage pattern of the battery module, and/or detected by a location value for the battery module that differs from an historical or expected location value;
j. a location value representing the location of the battery module, for example as detected using a global positioning satellite (GPS) system;
k. an alarm value or history, e.g. representing a record of alarms or faults experienced by the battery module;
l. a ganged/unganged value, e.g. representing a detection of whether or not the battery module is ganged together with one or more other battery modules in series or in parallel;
m. a transportation usage condition providing an indication that the battery module is being and/or has been used to power a vehicle or other transportation device, for example as detected by a pattern of accelerations of the battery module, and/or a speed of the battery module, and or a change in the location(s) of the battery module over time;
n. a stationary usage condition providing an indication that the battery module is being and/or has been used in a stationary position, for example as detected by a lack of accelerations of the battery module during a period of time, and/or a lack of change in the location of the battery over time;
o. a replace and/or recycle condition, e.g. as detected by an age of the battery module and/or an operative condition of the battery module.

As also discussed above, battery module(s) 202 are enabled for remote command and control by command center 236 through electromagnetic signaling received by battery module(s) 202. In this regard, signaling to the battery module can in some forms be representative of one of, any combination of some of, or all of:

signaling a user through display 224 of module 202;
signaling a user through lights 242, 244, 246;
managing the use and/or charging of battery cells 206;
disabling and/or enabling the draw of power from battery module 202 by a user (e.g. using those mechanisms therefor discussed herein).

System 200 can also include a user database 260 in which information correlated to a user or a plurality of users of battery modules 202 can be stored in memory, and from which such information can be retrieved by controller(s) 238. User information can include a name or names associated with an account for the battery module(s), an account number, contact information (e.g. residence or business address(es), cellular or other telephone contact number(s); computer-based contact information such as email address(es), and/or historical data regarding the account such as payment history, current payment status, and others. Appendix A and Appendix B below refer to user information in several instances and it will be understood that in some embodiments such information can be stored in, and retrieved from, user database 260. Such retrieval, and actions to the user (e.g notifications) or to the battery module(s) 202 can be automatically implemented by controller(s) 238 (e.g. in response to a rule or algorithm) or in other embodiments can be implemented by an input command from a person through input 240. In certain embodiments herein, the battery module(s) 202 can be disabled through a disable mechanism as described herein, such that a user can no longer draw power from the battery module(s) 202. This can be in response to a payment condition of an account correlated to the user. For example, where use of the battery module(s) 202 is on a pre-paid basis by a user correlated to the battery module(s) 202 (e.g. pre-paid for a period of time of usage of battery module(s) 202 or for a total amount of power (e.g. measured in kilowatt hours) drawn from battery module(s)), the battery module(s) can be disabled through the disable mechanism upon or after exhaustion of the pre-paid usage amount. Data and calculations related to total usage of battery module(s) 202 (e.g. in time period and/or in total power drawn) and comparison of the same to the total usage for which prepayment has been made can be stored and conducted locally by the electronics of battery module(s), and/or such storage and calculations can be conducted at command center 236 using controller(s) 238 and an associated memory device (e.g. solid state or other memory storage mechanisms). Appropriate notifications or warnings in advance of such disablement can be provided to the user, for example as specified in Appendix A and/or Appendix B. These notifications or warnings can be communicated at the battery module(s) and/or to alternate or secondary contacts for a user (e.g. stored in user database 260). As well, in some embodiments, system 200 can detect a current use condition of the battery module(s) 202 under which it would be unsafe to disable the battery module(s), and the remote disablement of the battery module(s) can be delayed until such current use condition has been terminated. For example, where battery module(s) 202 are detected to be currently in motion by global positioning satellite (GPS) tracking, accelerometer readings, or otherwise (e.g. where the motion is indicative of use to electrically power a car, scooter or other vehicle), the disablement command can be delayed until the battery module(s) is/are detected to be no longer in motion. Additionally or alternatively, a current use condition that would delay remote disablement may also be detected through sensing an external connection to the battery module(s) 202 through the electronics of the battery module(s) or otherwise, for example an external connection to a vehicle or to hospital equipment powered by the battery module(s). In other embodiments, a user or users of battery module(s) can pay for use of the battery module(s) in modes other than prepayment, for example by periodic payment, for example monthly, semi-annually or annually. In similar fashion to that discussed above for pre-paid use of battery module(s) 202, a user payment history in respect of such periodic payments due can be used to determine that the battery module(s) 202 will be disabled. Again, appropriate advance warnings or notifications can be provided to the user(s) and/or safety-related delays in disablement of the battery module(s) can be implemented by system 200.

Figure 1B:
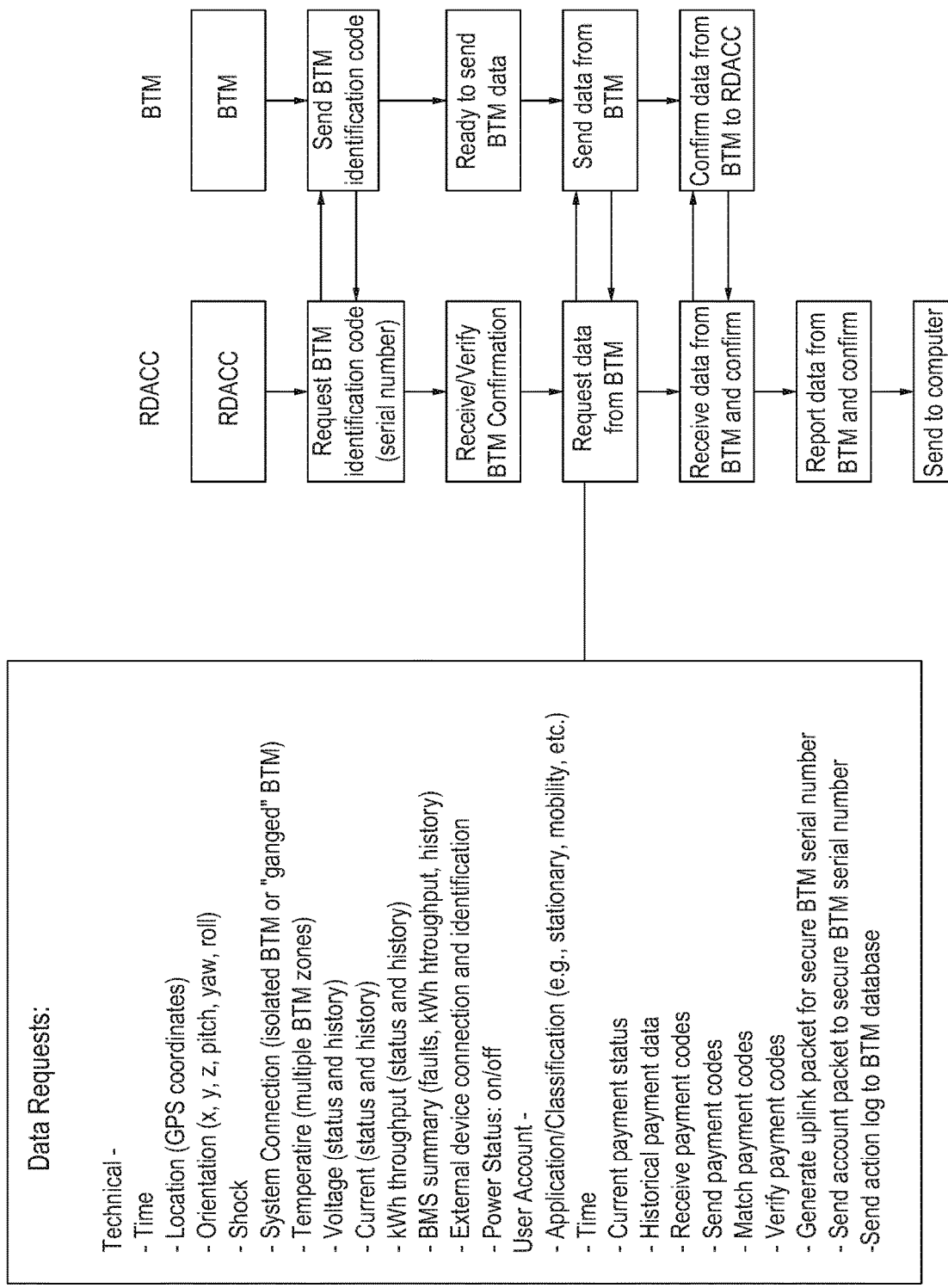
FIG. 1B provides a flow diagram of some embodiments implementing remote monitoring, command and control of one or more battery modules.

With reference now to FIG. 1B, shown is a schematic illustration of one illustrative remote communication implementation between a battery module(s) 202 and a command center 236 of system 200 described herein. As depicted, the communication can include a computer identification authentication between the center 236 and the module(s) 202, a data request from the command center 236, a data send by the module(s) 202, a data receipt confirmation from the center 236 to module(s) 202, and a display of the data on a display at the command center. FIG. 1B also specifies various types of data that may be involved in such a data request and transfer. It will be understood that such data requests and receipts can be used in implementing the various actions specified in Appendix A and/or Appendix B below.

Still additional details of detection, command and control features that can be incorporated in embodiments of system 200 are disclosed in Appendix A and Appendix B below.

Referring now generally to FIGS. 1C to 9 together, shown is one embodiment of a battery module 20 that can be used in aspects of the present invention. Battery module 20 includes an outer battery case 22, which is desirably composed of an impact-resistant polymeric material such as glass-reinforced polypropylene, a polymeric/carbon fiber composite, or the like. Battery module 20 also includes a reinforcing divider element 24 that is partially received within the interior of battery case 22. The reinforcing divider 24 is desirably a monolithic, thermally-conductive member that serves multiple purposes, including structurally reinforcing the battery case 22 to provide mechanical stability to module 20, as well as defining cavities for housing battery cells, such as lithium ion battery pouch cells 26. Reinforcing divider 24 also defines a plurality of thermal transfer element 80 that are positioned at least partially exterior of the interior enclosure of battery case 22, as discussed further below. In the preferred embodiment shown, thermal transfer elements 80 extend beyond a bottom wall 42 defined by case 22. Case 22 further defines a lip 23 extending below bottom wall 42 of case 22 and which is constructed and arranged to support the weight of module 20. Lower lip 23 can extend below bottom wall 42 sufficiently to reduce or eliminate any weight to be supported by thermal transfer elements 80 when module 20 is supported on a surface by lip 23. For these purposes, lower lip 23 can extend below bottom wall 42 a distance that is at least equal to, and desirably greater than, the distance that thermal transfer elements 80 extend below bottom wall 42. Lip 23 can define at least one opening, and desirably a plurality of openings 25, when module 20 is resting on a surface. This can serve to allow ventilation of the space underneath module 20, in which thermal transfer elements 80 reside, when module 20 is resting on a surface as supported by lip 23.

Battery module 20 also includes a control board 28 or other means electrically connecting the battery cells 26 to provide cell group(s) in series and/or parallel, a positive terminal 30, and a negative terminal 32 connected to the battery cell group(s). As well, battery module 20 can include a handle member 34 for carrying module 20, which can as illustrated be comprised of flexible straps and a grip connected to the battery case 22, for example by securing straps of handle 34 through openings 36 provided in a flange of case 22. Also, positioned within the battery case 22, between the case 22 and the reinforcing divider 24, is shock dampening material 38. Shock dampening material 38 can be provided as a singular unit or substance or can be provided at multiple, selected locations, interposed between and contacting surfaces of the reinforcing divider 24 and battery case 22. In this manner a stable fit of the divider 24 within the case 22 can be provided, that will prevent shifting of the divider 24 within the case 22 and mechanically integrate the divider 24 and the case 22 so that the divider 24 can serve to reinforce the case 22 against impact or shock forces imparted to the exterior of case 22. Desirably, reinforcing divider 24 will be reinforcibly mated in this fashion with at least the sidewalls and the bottom wall of the battery case 22. Suitable shock dampening materials 38 may include, for example, polymer foam materials such as PORON® Urethane foam (Rogers Corporation, USA) and/or elastomeric and/or polymeric substances (e.g. silicone or other rubbers), which may also serve as adhesives to bond the reinforcing divider 24 to the battery case 22.

Figure 2:
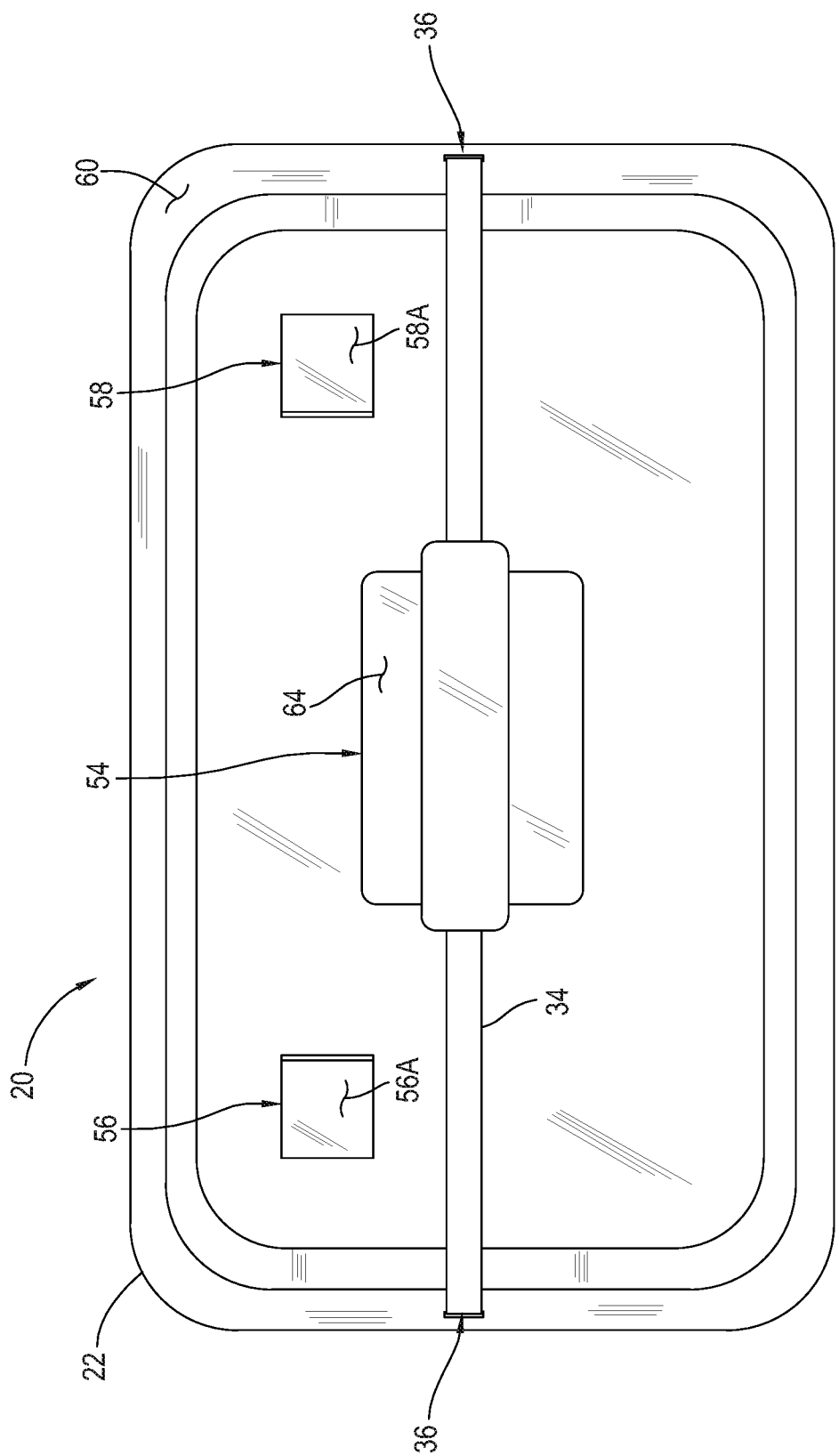
FIG. 2 provides a top view of the battery module of FIG. 1C.
Figure 3:
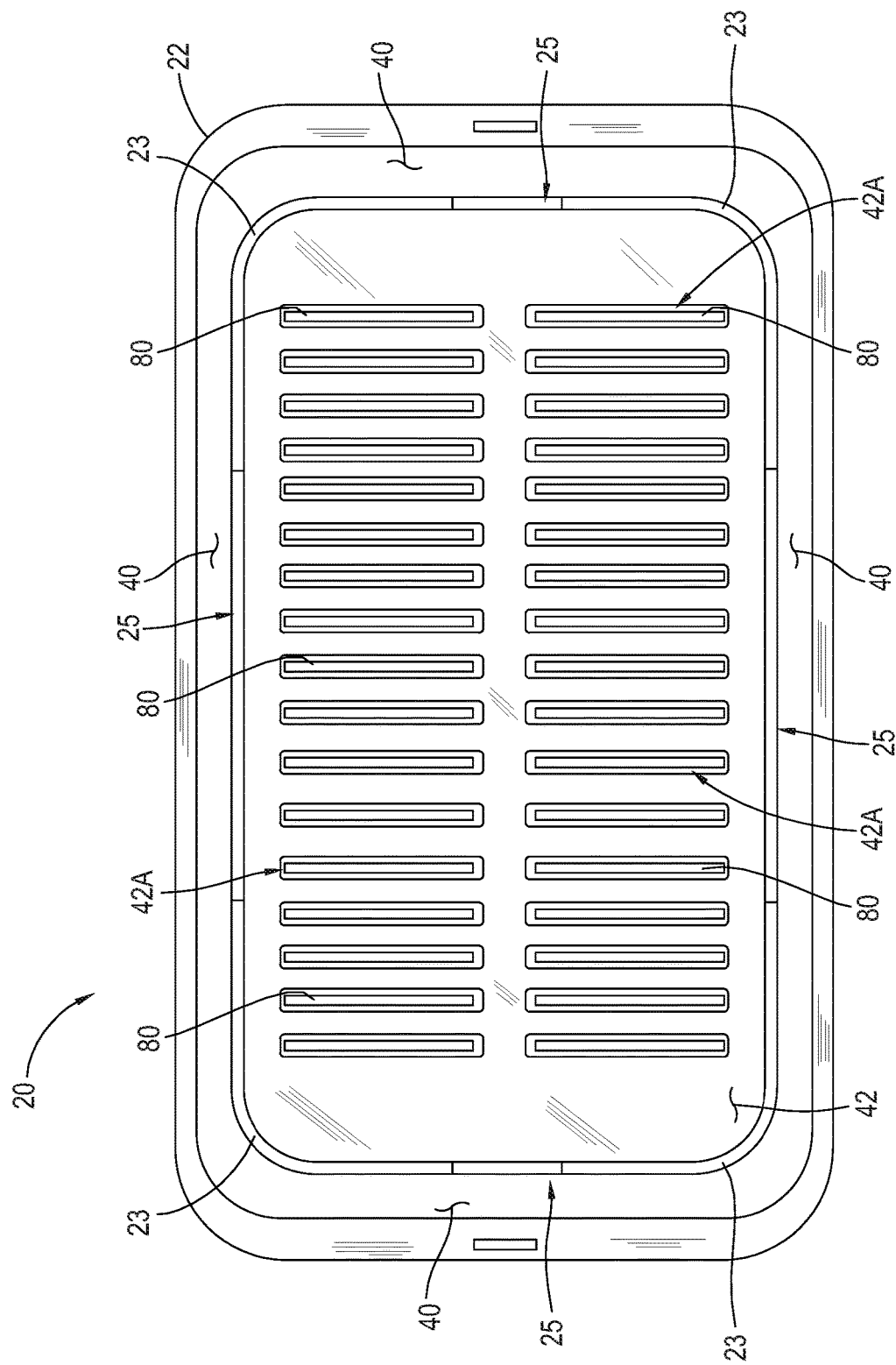
FIG. 3 provides a bottom view of the battery module of FIG. 1C.
Figure 4:
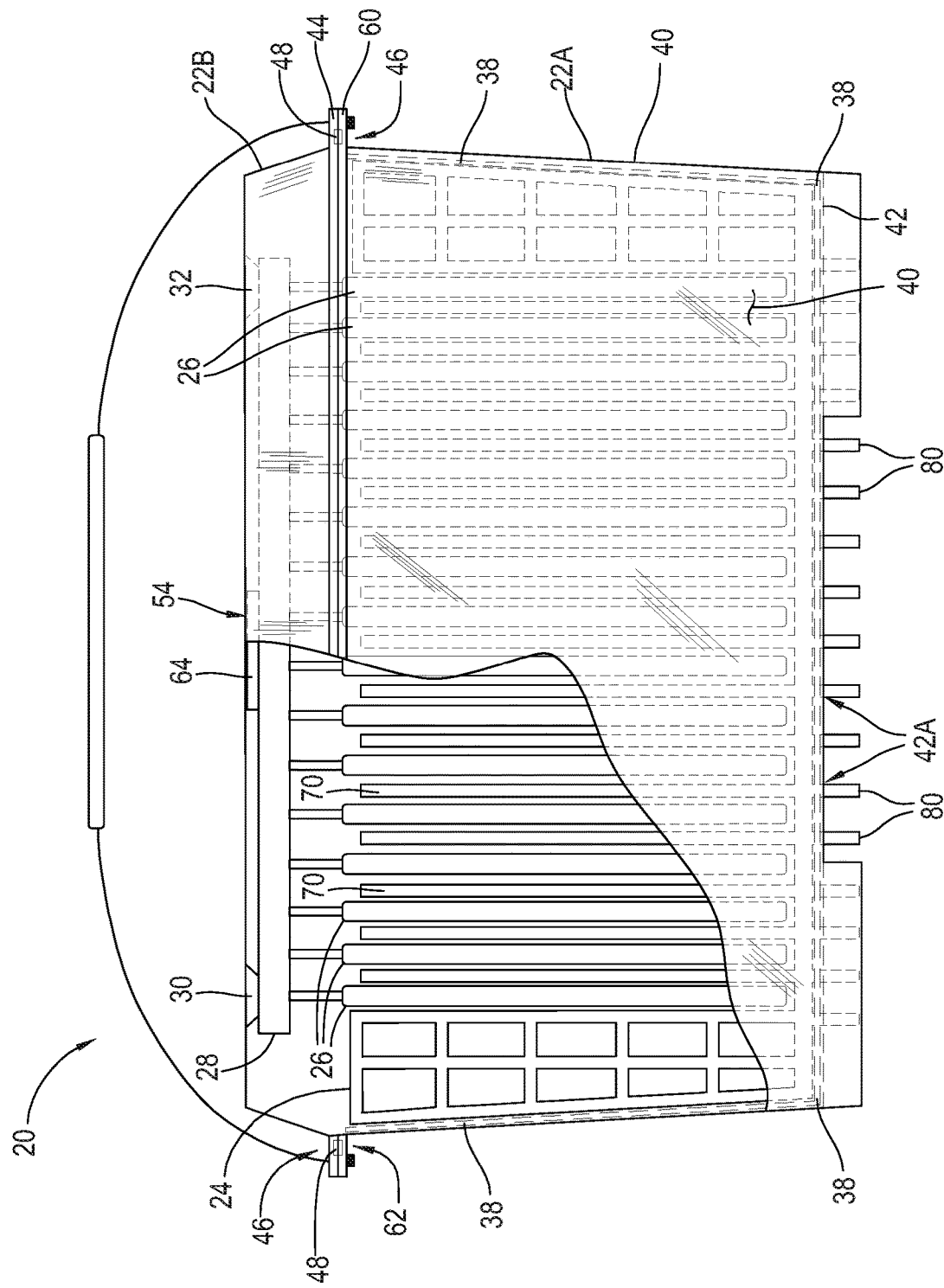
FIG. 4 provides a partial cut-away view of the battery module shown in FIG. 1C and illustrating internal components thereof.
Figure 4A:
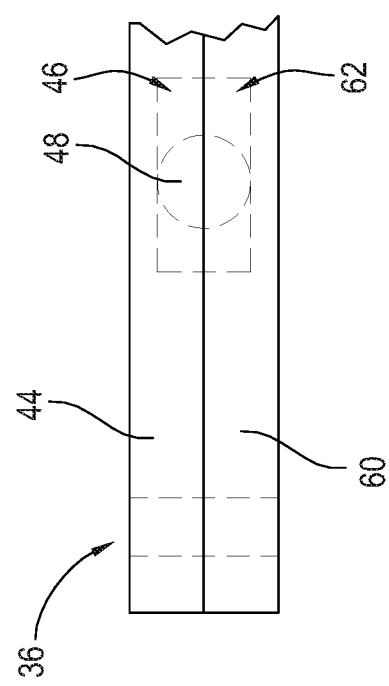
FIG. 4A provides an enlarged cut-away view of a section of the peripheral flange of the battery case as shown on the left side of FIG. 4.

Turning now to a more detailed discussion of various components of the battery module 20, shown in FIG. 4 is a partial cut-away view of the battery module 20 illustrated in FIGS. 1 to 3. Battery case 22 includes a lower portion or tub 22A and an upper portion or cap member 22B. Tub 22A defines an internal volume generally larger than that of cap member 22B, with tub 22A including side walls 40 connected to bottom wall 42. Bottom wall 42 defines a plurality of openings 42A (see FIGS. 3 and 8), such as slots, which are arranged to receive therethrough projecting thermal transfer members 80 defined by the reinforcing member 24. Case tub 22A also defines a peripheral flange 44, which can be used for sealing engagement with battery case cap member 22B. Peripheral flange 44 can define a cavity such as a slot 46 (shown in phantom in FIG. 4; see also enlarged cutaway section in FIG. 4A, and FIG. 8), for receipt of a compressible seal member 48 (phantom, FIG. 4) to aid in creating a sealed environment, desirably a hermetically or other moisture-proof sealed environment, within the assembled battery case 22. Battery case cap member 22B defines sidewalls 50 and a top wall 52. Top wall 52 defines a number of openings including a first opening 54 for receipt of a display screen 64 for displaying information, for example about the status of one or more conditions of battery module 20. Top wall 52 also defines openings 56 and 58 for receipt of and providing access to positive 30 and negative 32 terminals of battery module 20. Cap member 22B can also in certain embodiments define terminal covers 56A and 58A which are arranged to reversibly cap or cover openings 56 and 58, respectively, to enable selective protection of terminals 30 and 32 from environmental conditions such as contaminants, moisture, or others. Covers 56A and 58A can for example be caps that are secured to capping member 22B by a molded, living hinge. Cap member 22B also defines a peripheral flange 60 arranged to mate with peripheral flange 44 of tub 22A. Peripheral flange 60 can define a cavity 62 such as a slot (shown in phantom, FIG. 4; see also enlarged cut away section in FIG. 4A, and FIG. 9), for alignment with slot 46 of flange 44 of tub 22A, for capturing and compressing the seal member 48 within a seal cavity defined by cavities 46 and 62 combined. In the assembly of battery casing 22, the tub 22A and cap member 22B can be attached to one another in any suitable manner including for example the use of an ultrasonic weld between flanges 44 and 60, respectively, the use of adhesive or bonding agents, the use of suitable connectors such as bolts and nuts, or any other suitable means.

Within the battery case 22 when assembled, electronic control board 28 electrically connects pouch cells 26, for example in series and/or parallel in groups. This electrical connection can be made in any known manner including for example by ultrasonic welding of the positive and negative electrodes of the pouch cells 26 to control board tabs, where the control board contains the necessary conductive materials to arrange the connected pouch cells 26 in series and/or parallel as desired. In addition to providing the cell connectivity, the control board 28 can contain circuitry, software and/or other components for sensing and/or communications, cellular or global positioning satellite signaling for purposes of locating or tracking module 20, and/or for data transfer, including in some embodiments two-way data transfer. Some or all sensed conditions of the cell, or information relating to communications, signaling or data transfer, can be displayed on a display 64 coupled to control board 28. Display 64 may, for example, be a liquid crystal display (LCD). Such a display 64 may, for example, display the state of charge and/or state of health of the battery module or of individual or groups of battery cells within the battery module 24, and may for example common indicators of health of charge such as a selected color like red, yellow, or green to signify a state of charge or health of the battery module 20. The inclusion of electronics for communication and data transfer can provide for the generation of electromagnetic signals by the module 20 or other modules of the invention for remote reporting and/or data collection with regard to sensed conditions of and/or location of the battery module 20 and potentially also for receiving signals for control of operation(s) of the module 20 from remote locations, and can for example utilize cellular and/or satellite communications networks for these purposes. These electronics are incorporated into the control board (e.g. control board 28) in certain embodiments.

Control board 28 is also electrically connected to a positive electrical terminal 30 and a negative electrically terminal 32, which as will be understood are ultimately connected to the pouch cell or cells 26, and which provide electrical access to draw upon the electrical potential stored by battery module 20. Terminals 30 and 32 can provide either male or female type connectors for connecting to cables or other conductive members, with female connectors being provided in some preferred embodiments. It will be understood that as located upon control board 28, terminals 30 and 32 will be arranged to correspond in location with openings 56 and 58 in cap member 22B, respectively, and that display 64 will be arranged to correspond in location with opening 54 in cap member 22B. It will also be understood that these components 66, 68 and 64 can be sealingly received in or through openings 56, 58 and 54, potentially with the use of gaskets or sealants or the like, to facilitate a sealed environment within case 22.

Figure 6:
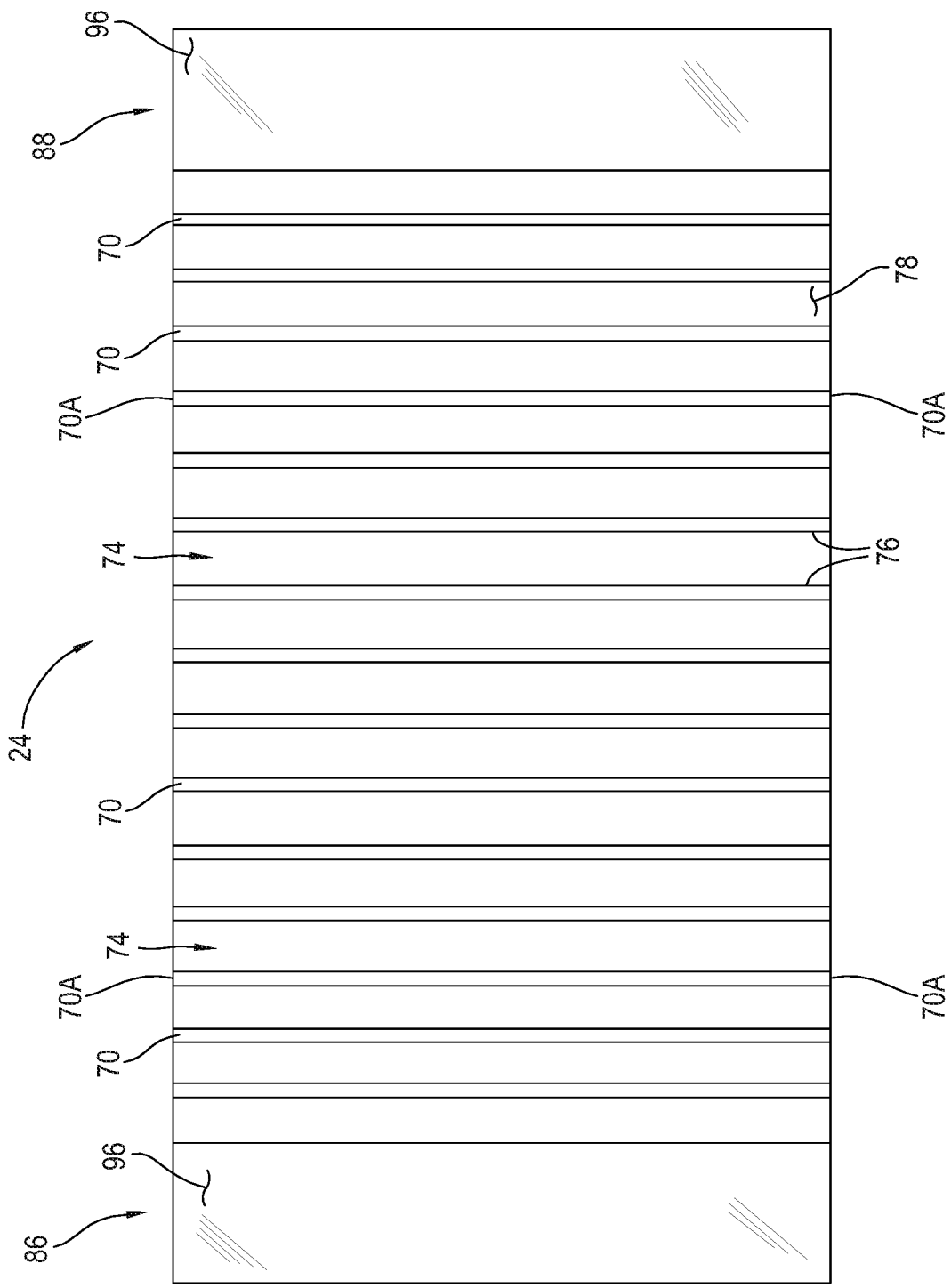
FIG. 6 provides a top view of the reinforcing divider shown in FIG. 5.
Figure 7:
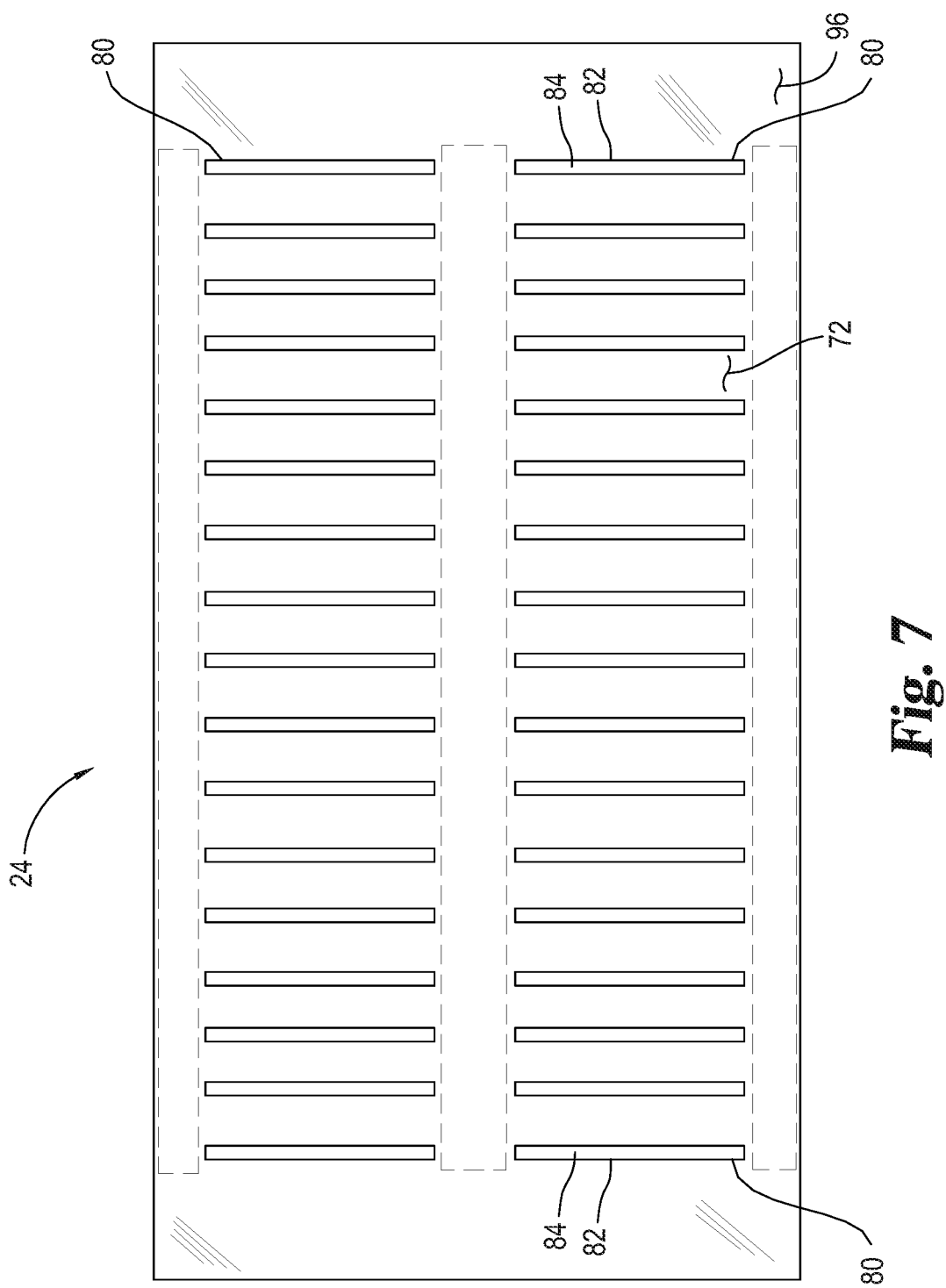
FIG. 7 provides a bottom view of the reinforcing divider shown in FIG. 5.

With particular reference to FIGS. 5 to 7, shown are front, top and bottom views, respectively, of multi-purpose reinforcing divider 24. Divider 24 includes a plurality of wall members 70 which in the depicted embodiment are arranged in generally parallel fashion relative to one another. Wall members 70 are connected by a set of transverse wall members 72 which retain wall members 70 in positions spaced from one another. Cross walls 72 can in certain embodiments be thicker than dividing wall members 70. Reinforcing divider 24 thereby defines a plurality of cavities 74, in the depicted embodiment in the form of slots, which are defined between sidewalls 76 of adjacent wall members 70. A lower wall 78 of slots 74 is defined by an upper surface of the cross wall members 72. Reinforcing divider 24 also defines a plurality of thermal transfer elements 80 which are connected to cross wall members 72. In the depicted embodiment, thermal transfer elements 80 generally form continuing portions of wall members 70 occurring on the opposite side of cross walls 72. Other arrangements are of course possible within the scope of the invention. Thermal transfer elements 80 include sidewalls 82 and a bottom wall surface 84, to be exposed exterior of the interior enclosure defined by battery case 22 in the depicted embodiment (See e.g. FIG. 1, bottom). As shown particularly in FIG. 7, thermal transfer members 80 are provided in two rows. This arrangement can be provided by modification of an extruded member (e.g. extruded aluminum or other metal) extruded to a continuous shape having the profile shown in FIG. 5. This modification can include removal of sections of the lowermost wall portions from which thermal transfer elements are formed (see dotted-line rectangular boxes in FIG. 7 representing areas where extruded wall sections have been removed), for example by machining, to result in the rows of elements 80 as shown. Appropriate finishing of the machined or otherwise modified extruded piece, for example using polishing or other smoothing operations, can be applied in the manufacture of the reinforcing divider 24.

Reinforcing divider 24, in the preferred embodiment depicted, also includes integrated external reinforcing scaffolding structures 86 and 88. Reinforcing scaffolding structures 86 and 88 each include a plurality of elongate scaffold walls 90, 92, 94 extending in a first direction and a plurality of cross-scaffold walls 96 extending in a second direction transverse to the first direction, and connecting the elongate scaffold walls 90, 92, 94. Reinforcing scaffolding structures 86 and 88 can thereby define a plurality of closed cells 98. The outermost walls 94 of scaffolding structures 86 and 88 can extend non-parallel to walls 90 and 92 and to walls 70, and in preferred embodiments are each inclined at an angle to position them, when divider 24 is received in battery case 22, in a substantially parallel plane to adjacent sidewalls of the battery case 22 that the walls 94 will reinforce. Scaffolding structures 86 and 88 can provide enhanced mechanical strength and increase the resistance of the reinforcing divider 24 to damage from impact forces directed at the outer surfaces of scaffolding structures 86 and 88.

Figure 8:
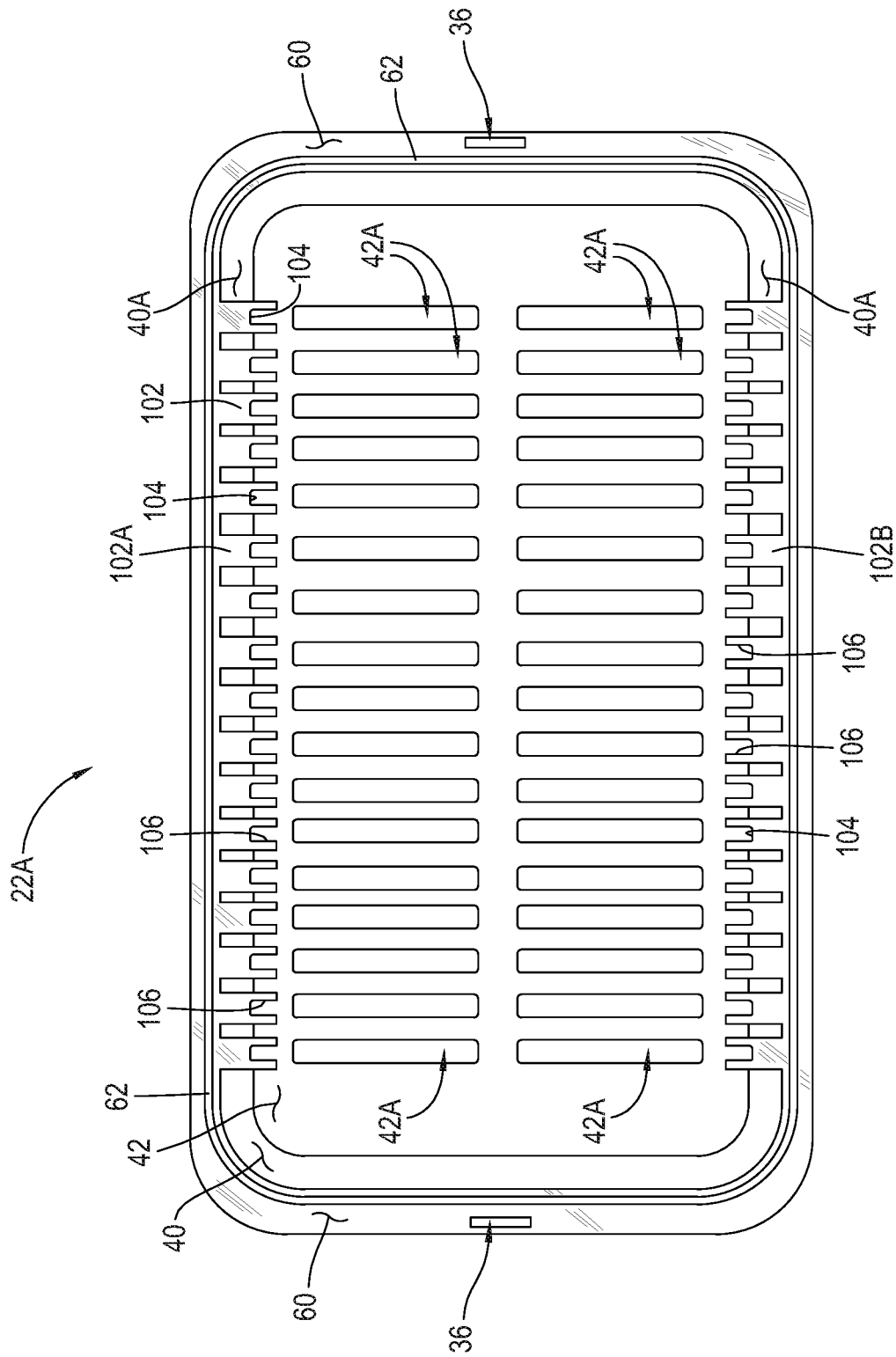
FIG. 8 provides a view of the inside of the battery case tub of the battery case of the battery module of FIGS. 1C to 4.
Figure 9:
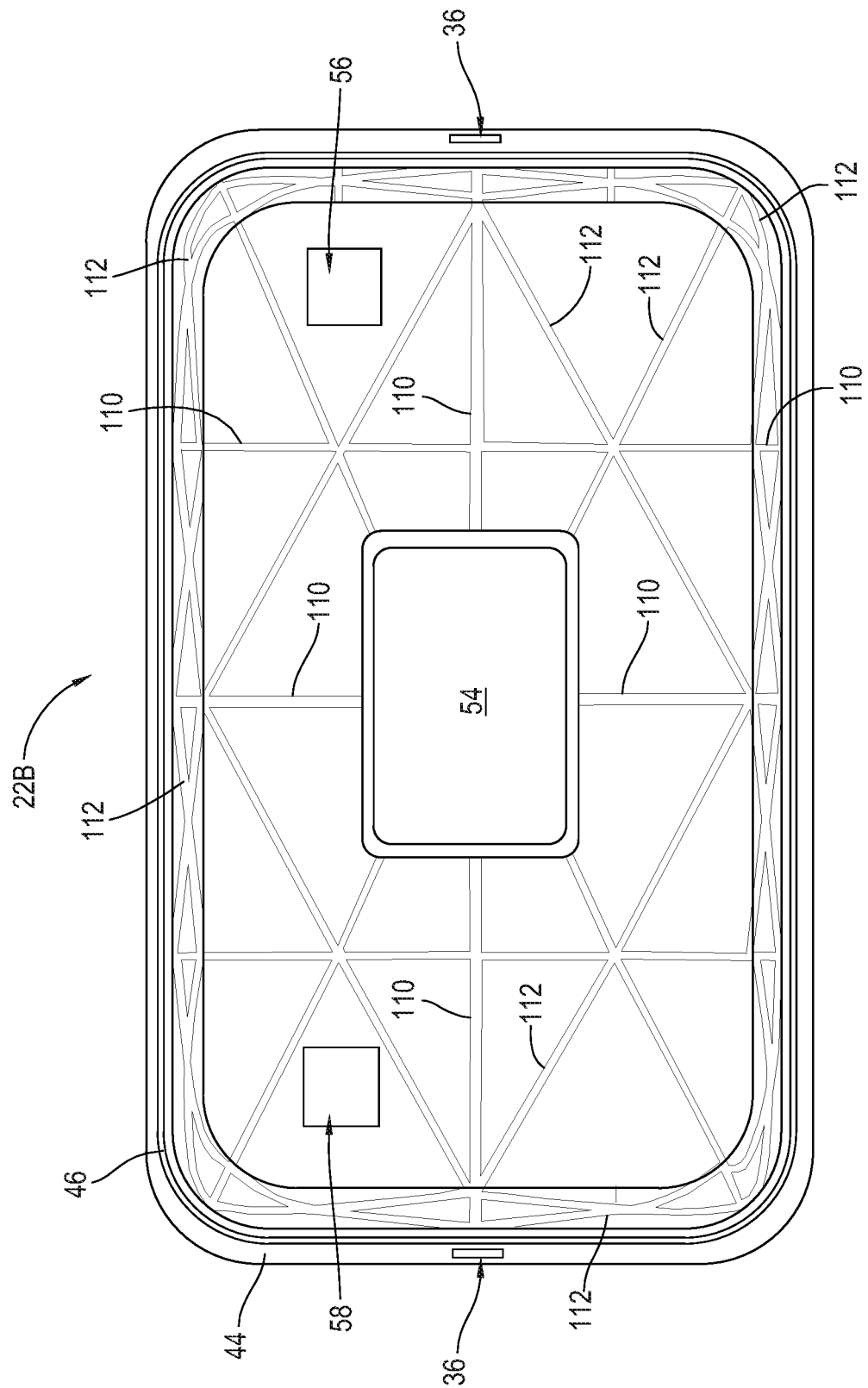
FIG. 9 provides a plan view of the inside of the battery case cap member of the battery module of FIGS. 1C to 4.

Shown in FIGS. 8 and 9 are views illustrating the interior regions of the battery case tub 22A and the battery case cap member 22B, respectively. In FIG. 8, the plurality of bottom wall openings 42A can be clearly seen. As shown, the openings 42A are provided in two sets extending along the length of tub 22A, divided by a central wall region 100 which spans between first lateral end wall portion 102 and second lateral end wall portion 104. As shown, rows of dimensionally identical openings, in the depicted embodiment slots, occur on either side of central wall portion 100. It is preferred that the bottom wall of tub 22A, as shown, includes at least one internal rib or wall portion 100 spanning between sets or groups of openings, to provide structural stability to the bottom wall of tub 22A. As will be understood, the thermal transfer members 80 of reinforcing divider 24 are constructed and arranged to correspond in location to the openings 42A in the bottom wall 42 of tub 22A, and to be receivable through the openings 42A. A layer or bead of shock dampening material (38, see previous FIGS.) can be provided on the inner surface of bottom wall 42 of tub 22A, to contact the lower surfaces of cross walls 72 and 96 of the reinforcing divider 24 when assembled into tub 22A. This shock dampening material may also optionally be sufficient to create a sealed periphery around the 42A collectively, in groups, or individually. This can provide a lower seal for the interior region of case 22 residing above and housing the battery cells 26 and potentially electronic components of control board 28, such that gases or other potential contaminants passing into openings 42A do not pass into such interior region. Alternatively, separate sealing agents or mechanisms can be used.

Also shown in FIG. 8 is a plurality of slotted retainers 102 for capturing the lateral edge portions 70A (see FIG. 6) of walls 70 of reinforcing divider 24. Slotted retainers 102 each define a slot having a back wall 104 that is inclined relative to the inner surface 40A of the adjacent sidewalls 40, with back wall 104 preferably extending perpendicular to bottom wall 42 and thus situating in a substantially vertical plane when bottom wall 42 is positioned in a substantially horizontal plane. Further, the back walls 104 of retainers 102 aligned with one another on opposed sides of the tub 22A (e.g. retainers 102A and 102B as labeled in FIG. 8) are preferably spaced a distance from one another such that the lateral edge portions of walls 70 of retainer 24 are captured in the respective slots of the retainers, potentially frictionally engaging such lateral edge portions either with walls 104 and/or walls 106, and/or with a shock dampening material (e.g. an adhesive and/or foam material as described herein) received within the slots of the retainers 102. This further facilitates a mechanical integration of reinforcing divider 24 and battery case 22. In the preferred battery module 20, the slot back walls 106 and the lateral edges of reinforcing divider walls 70 both extend substantially vertically when module 20 is placed with the lower surface of the bottom lip 23 residing upon a horizontal surface.

Referring now particularly to FIG. 9, located on the interior of cap member 22B are a plurality of reinforcing struts or ribs that increase the structural integrity and strength of the cap member 22B. In the depicted cap member 22B, primary, thicker ribs 110 divide portions of the cap member 22B into generally quadrilateral segments, and are interconnected by secondary, thinner ribs 112 which define a plurality of triangular enclosures. The ribs, e.g. 110 and 112, can be molded integrally with the cap member 22B, and can for example be about 1 to 3 mm in height as they extend inward from the inner surface of the outer wall of the case cap member 22B. Corresponding or similar reinforcing rib structures are also desirably provided on the interior of battery case tub 22A.

In operation, battery module 20 provides a highly protected, thermally managed condition for battery cells 26. Thermal energy (heat) generated during operation of battery cells 26 can transfer to walls 70 of reinforcing divider and from there to thermal transfer elements 80 exposed externally of the sealed environment of the case 22 in which cells 26 are housed. Similarly, heat from the environment external of the battery can be transferred to battery cells 26 where cells 26 are cooler than the external environment, as may occur during charging or a non-operational state of cells 26. In some embodiments, a thermally conductive material, for example a thermally conductive adhesive material, can be positioned between and potentially contact and/or adhere the outer surfaces of cells 26 and the walls 70. The thermal management provided can aid in optimizing the performance of cells 26. In the illustrated embodiment, the thermal management of cells 26 is passive thermal management, in that no active heating or cooling fluids are circulated through or against the thermally-conductive reinforcing divider 24. It will be understood that active heating or cooling could be applied to reinforcing divider 24 in other embodiments, and divider 24, e.g. walls 70 thereof, may optionally be modified with grooves, internal lumens or cavities, to circulate heating/cooling fluids in such other embodiments. Passive thermal management is preferred, as it simplifies the design and operation of battery module 22.

It will also be understood that although the battery module 20 above has been illustrated and described in conjunction with prismatic lithium ion pouch cells 26, other battery cells may also be used including cylindrical lithium ion battery cells (in which case reinforcing divider 24 may be modified to define cylindrical cavities for housing the cells), as well as battery cells employing other battery chemistries. Further, it will be understood that a number of lithium ion cell constructions and chemistries are known and available for use in embodiments of the invention, including both wet electrolyte and solid electrolyte (e.g. polymeric) designs.

Further, additional embodiments of the invention are provided wherein a reinforcing divider, potentially monolithic and thermally conductive as described herein, is received completely within a sealed interior of a battery case, and thus providing no externalized thermal transfer elements. Such reinforcing dividers can nonetheless facilitate robust, mechanically stable battery module constructions, particularly where the reinforcing divider reinforces the battery case with a shock dampening material therebetween. Still further, embodiments are provided where the battery module has the structure shown for module 20, with externalized thermal transfer elements 80 beneficially extending below a bottom wall 42 of the battery case and even more beneficially being protected by a lower lip 23, but wherein the reinforcing divider is not monolithic but rather can be made from multiple pieces connected together by screws, bolts or other connection mechanisms. Module 20 and modified versions thereof, with externalized transfer elements extending only out of a bottom wall, provide efficient thermal management while minimizing exposure of the thermal transfer elements 80 for potentially injurious contact with users of the module, or damaging contact with other structures.

Particularly beneficial battery modules of the invention will exhibit high energy densities (power-to-weight ratios), with energy densities of at least 50 watt-hours per kilogram (Wh/kg), and generally in the range of 70 Wh/kg to 200 Wh/kg, being contemplated in certain embodiments herein. In preferred modes, the battery module will exhibit good portability, weighing less than about 12 kilograms, typically in the range of about 10 to about 12 kilograms. As well, desirable storage capacities for the battery module will be at least 1 kilowatt hour (kWh), typically in the range of about 1.5 kWh to about 2.5 kWh. A range of operational voltage capacities may be embodied, including for example at least about 36 volts direct current (DC), and typically about 48 to about 60 volts DC.

The uses of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In addition, all references cited herein are indicative of the level of skill in the art and are hereby incorporated by reference in their entirety.

APPENDIX A

| User Information Account Processes<br>User Care and Billing<br>BTM (Battery Module) | | |
|---|---|---|
| Item | Display | Action |
| Account | Account number | Identify account and align with historical data |
| User Information | User name, address, time with energy company | Identify account with name and align with historical data |
| BTM Serial Number(s) | All BTM serial numbers associated with account number | Align or match historical data between BTM and user account number and report |
| BTM Technical Data | Iconic models of BTMs associated with account | Provide all historical data of BTMs upon selection |
| Current Balance | Account(s) monetary balance | If greater than zero then send "green" signal for status. If equal to zero or less send "red" signal for status |
| Payoff Balance | Only if negative value | Report negative balance |
| Previous Bill | Date and amount of previous bill with payment due date | Report |
| Last Payment | Date and amount | Report |
| Next Billing Cycle | Payment due date, days in between | Report |
| Pending Bill Exists | Date and amount | Report |
| Pending Payments | Date and amount | Report |
| Payment History | 1 month, 3 month, 6 month, 9 month, 12 month, 2 year, 4 year, historical (options) | Upon selection criteria display data |

APPENDIX A-continued

User Information Account Processes
User Care and Billing
BTM (Battery Module)

| Item | Display | Action |
|---|---|---|
| User Payment Score | 1, 2, 3, 4, or 5 (value) | associate highest score/value with green color = 1; blue color = 2; yellow color = 3, gray color = 4, red color = 5 (poorest score/value) |
| Action to User (based on payment) | Display notice, action and corresponding customer classification | Action can vary from report generation, status text, to terminating service (shutting off or disabling BTM through disable mechanism of BTM) |
| BTM GPS Tracking | Global/Regional/Local Map | Provide dotted line of BTM |
| Auto-Pay Active | yes/no | Appears when the account has an automatic payment option effective on the current date and appears if Auto-Payment functionality is enabled. |
| Warnings | series of boolean fault codes (10 lights) | based on boolean series correlate to specific warning statements |
| Interruptions | database of interruptions or faults | Report |
| Power Off | Sleep Mode Indication | Sleep Mode |

APPENDIX B

BTM Management and Control
Diagnostics, Data, Control
BTM (Battery Module)

| Item | Display | Action to HQ | Reaction in RDAAC | Action to BTM | External Action to User |
|---|---|---|---|---|---|
| Battery Voltage | Value | if less than X, or higher than Y, then alert | analyze and place value in "action" step to HQ and BTM | green, green flashing, yellow, yellow flashing, red, red flashing* | turn on corresponding lighting on BTM with text/digital display to describe condition (e.g., "normal voltage", "low voltage", "voltage fault", etc.) - if red flashing conditionally plan to turn BTM off in predetermined manner; optional or alternative notification to secondary contact for user stored in user database (e.g. cellular telephone, email) |
| Cell Voltage | Value | if less than X, or higher than Y, then alert | analyze and place value in "action" step to HQ | | |
| Battery Temp | Value | if less than X, or higher than Y, then alert | analyze and place value in "action" step to HQ and BTM | green, green flashing, yellow, yellow flashing, red, red flashing* | turn on corresponding lighting on BTM with text/digital display to describe condition (e.g., "normal temp" "low/high temp", "temp fault", etc.) - if red flashing conditionally plan to turn BTM off in predetermined |

APPENDIX B-continued

BTM Management and Control
Diagnostics, Data, Control
BTM (Battery Module)

| Item | Display | Action to HQ | Reaction in RDAAC | Action to BTM | External Action to User |
|---|---|---|---|---|---|
| | | | | | manner; optional or alternative notification to secondary contact for user stored in user database (e.g. cellular telephone, email) |
| Cell Temp | Value | if less than X, or higher than Y, then alert | analyze and place value in "action" step to HQ | | |
| Battery Capacity | Value(s) | poll frequently, and if less than X, or higher than Y, then alert | analyze and place value in "action" step to HQ and BTM | green, green flashing, yellow, yellow flashing, red, red flashing* | turn on corresponding lighting on BTM with text/digital display to describe condition (e.g., "normal capacity" "low capacity", "capacity fault", etc.) - if red flashing conditionally plan to turn BTM off in predetermined manner; optional or alternative notification to secondary contact for user stored in user database (e.g. cellular telephone, email) |
| Position | x, y, z, pitch, yaw, roll | if less than X, Y, Z, P, Y, R, or higher than X, Y, Z, P, Y, R then alert | analyze and place value in "action" step to HQ | | |
| Thermal Management | Value | if less than T1, or higher than T2, then alert | analyze and place value in "action" step to HQ | | |
| Abuse | Breach (on/off) | alert, shut down | analyze and place value in "action" step to HQ and BTM | green, green flashing, yellow, yellow flashing, red, red flashing* | turn on corresponding lighting on BTM with text/digital display to describe condition (e.g., "normal operation", "slight abuse", "abuse fault", etc.) - if red flashing condition plan to turn BTM off in predetermined manner; optional or alternative notification to secondary contact for user stored in user database (e.g. cellular telephone, email) |

APPENDIX B-continued

BTM Management and Control
Diagnostics, Data, Control
BTM (Battery Module)

| Item | Display | Action to HQ | Reaction in RDAAC | Action to BTM | External Action to User |
|---|---|---|---|---|---|
| Current | Value | if less than X, or higher than Y, then alert | analyze and place value in "action" step to HQ and BTM | green, green flashing, yellow, yellow flashing, red, red flashing* | turn on corresponding lighting on BTM with text/digital display to describe condition (e.g., "normal voltage", "low voltage", "voltage fault", etc.) - if red flashing condition plan to turn BTM off in predetermined manner; optional or alternative notification to secondary contact for user stored in user database (e.g. cellular telephone, email) |
| kWh throughput | Cumulative value | report hourly daily, weekly, monthly, annually | analyze and place value in "action" step to HQ and BTM - HQ to store all kWh data in historical database aligned with user data, etc. | green, green flashing, yellow, yellow flashing, red, red flashing* | turn on corresponding lighting on BTM with text/digital display to describe kWh throughput status, rate, payment status, condition (e.g., "normal voltage", "low voltage", "voltage fault", etc.) - if red flashing condition plan to turn BTM off in predetermined manner; optional or alternative notification to secondary contact for user stored in user database (e.g. cellular telephone, email) |
| recycling | physical age, status | Remaining time of 20 year life | analyze and place value in "action" step to HQ | | |
| anti-theft | Breach (on/off) | alert, shut down | analyze and place value in "action" step to HQ and BTM | green, green flashing, yellow, yellow flashing, red, red flashing* | turn on corresponding lighting on BTM with text/digital display to describe condition (e.g., "normal owner" "owner breach underway", "owner fault", etc.) - if red flashing condition plan to turn BTM off in predetermined manner; optional or |

APPENDIX B-continued

BTM Management and Control
Diagnostics, Data, Control
BTM (Battery Module)

| Item | Display | Action to HQ | Reaction in RDAAC | Action to BTM | External Action to User |
|---|---|---|---|---|---|
| | | | | | alternative notification to secondary contact for user stored in user database (e.g. cellular telephone, email) |
| Global Positioning Satellite (GPS) | location coordinates | verify, confirm/alert | analyze and place value in "action" step to HQ | | |
| alarms | record of alarms faults, etc. | store data with BTM and User(s) | analyze and place value in "action" step to HQ | | |
| single BTM (non-ganged) | Value | send indication of use | analyze and place value in "action" step to HQ | | |
| ganged | Value | send indication of use, and connected items | analyze and place value in "action" step to HQ | | |
| transportation use of BTM | Value | send indication of proper use and map of daily travel | analyze and place value in "action" step to HQ | | |
| stationary use of BTM | Value | send indication of proper use and map of location | analyze and place value in "action" step to HQ | | |
| use strategy for BTM | Value(s) | projected versus actual use profiles | analyze and place value in "action" step to HQ | | |
| capacity strategy for BTM | Value(s) | projected versus actual use profiles | analyze and place value in "action" step to HQ | | |
| historical data and use for BTM | Value(s) | projected versus actual use profiles | analyze and place value in "action" step to HQ | | |
| energy management strategy for BTM | Value(s) | projected versus actual use profiles | analyze and place value in "action" step to HQ | | |
| external connection(s) to BTM | Protocols & Match | confirm protocol connection - send yes or no | analyze and place value in "action" step to HQ | | |

*green = perfect condition
green flashing = leaving prefect condition and moving toward caution
yellow = caution
yellow flashing = leaving caution status and moving toward alert or fault status
red = alert/fault status
red flashing = system shut down is imminent

The invention claimed is:

1. A system for management and control of one or more battery modules, the system comprising:
   one or more battery modules including a battery case, a plurality of battery cells received within the battery case, a negative electrical terminal electrically coupled to the battery cells, a positive electrical terminal electrically coupled to the battery cells, and electronics received within the battery case and configured to enable electromagnetic signaling to and from the battery module;
   a controller remote from and communicatively coupled to the one or more battery modules and configured to receive the electromagnetic signaling from the battery module and transmit the electromagnetic signaling to the battery module;
   a user database in which user information correlated to one or more users of the one or more battery modules is stored in memory and from which the user information can be retrieved by the controller;
   wherein the user information includes payment history information or current payment status information for one or more accounts correlated to the one or more users; and
   wherein the payment history information or current payment status information is correlated to payment by the one or more users for draw of power from the one or more battery modules; and
   wherein the one or more battery modules include a disable mechanism responsive to the electromagnetic signaling to the battery module and operable to disable use of a voltage potential between the positive electrical terminal and the negative electrical terminal.

2. The system of claim 1, wherein the electromagnetic signaling from the battery module is representative of one of, any combination of some of, or all of:
   a. a voltage value;
   b. a temperature value;
   c. a capacity value representing an amount of energy that can be extracted from the battery module under a specified set of conditions;
   d. one or more orientation values representing one or more orientations of the battery module;
   e. a thermal value;
   f. a battery module abuse condition;
   g. an electrical current value;
   h. an energy usage value;
   i. a battery module theft condition;
   j. a location value representing the location of the battery module;
   k. an alarm value or history;
   l. a ganged/unganged value representing a detection of whether or not the battery module is ganged together with one or more other battery modules in series or in parallel;
   m. a transportation usage condition;
   n. a stationary usage condition;
   o. a replace and/or recycle condition.

3. The system of claim 1, wherein the electromagnetic signaling to the battery module is representative of one of, any combination of some of, or all of:
   signaling a user through a display;
   signaling a user through one or more lights;
   managing the use and/or charging of battery cells;
   disabling and/or enabling the draw of power from the battery module.

4. The system of claim 3, including a plurality of said battery modules, and wherein:
   the electronics of each of the battery modules is operable to generate a value representative of cumulative power drawn from the battery cells over a period of time and to transmit the value to said controller by said electromagnetic signaling from the battery module.

5. A system of claim 1, wherein the one or more battery modules include an externally-visible display, and wherein the electromagnetic signaling to the one or more battery modules includes electromagnetic signaling to visibly signal the one or more users through the externally-visible display.

6. A system of claim 1, also comprising:
   an electrical charging source coupled to or capable of coupling to the battery module to electrically charge the battery module.

7. A system of claim 6, wherein the electrical charging source is a solar-powered charging source.

8. A system of claim 6, wherein the electrical charging source is a wind-powered charging source.

9. A system of claim 6, wherein the electrical charging source is an electrical grid-powered charging source.

10. A system of claim 6, wherein the electrical charging source is associated with an electrical component configured to enable and/or disable charging of the battery module by the electrical charging source in response to received electromagnetic signaling.

11. A system of claim 1, wherein the electronics are operable to generate a value representative of cumulative power drawn from the battery cells over a period of time and to transmit the value to the controller by said electromagnetic signaling from the battery module.

* * * * *